United States Patent [19]

Bienert et al.

[11] Patent Number: 4,531,777
[45] Date of Patent: Jul. 30, 1985

[54] MOTOR VEHICLE ROOF ARRANGEMENT OF THE TYPE INTERCHANGEABLY DRIVEABLE BY BOTH MOTOR AND CRANK DRIVES

[75] Inventors: Horst Bienert, Gauting; Alfons Lutz, Emmering, both of Fed. Rep. of Germany

[73] Assignee: Webasto-Werk W. Baier GmbH & Co., Fed. Rep. of Germany

[21] Appl. No.: 495,493

[22] Filed: May 17, 1983

[30] Foreign Application Priority Data

Jul. 3, 1982 [DE] Fed. Rep. of Germany ....... 3224896

[51] Int. Cl.³ .............................................. B60J 7/00
[52] U.S. Cl. .................................... 296/223; 296/221; 74/625
[58] Field of Search ......................... 296/216, 220–223; 49/360; 74/625

[56] References Cited

U.S. PATENT DOCUMENTS

| 2,953,368 | 9/1960 | Jones | 74/625 |
| 3,266,328 | 8/1966 | Rott | 296/223 |
| 3,948,119 | 4/1976 | Schlapp | 296/223 |
| 4,085,629 | 4/1978 | Fogarollo | 74/625 |
| 4,191,068 | 3/1980 | Jardin et al. | 74/625 |
| 4,272,125 | 6/1981 | Bienert et al. | 296/223 |
| 4,332,416 | 6/1982 | Lutz et al. | 296/222 |

FOREIGN PATENT DOCUMENTS 2135803 8/1977 Fed. Rep. of Germany ...... 296/223

Primary Examiner—Robert B. Reeves
Assistant Examiner—Dennis H. Pedder
Attorney, Agent, or Firm—Sixbey, Friedman & Leedom

[57] ABSTRACT

A motor vehicle roof arrangement having a cover that can be slid and/or tilted out with respect to an opening in the roof. The cover is movable by means of an electric motor through at least one incompressible driving cable. The electric motor is mounted at a front side of the opening in the roof on a stationary part of the roof, and by means of a secondary drive wheel of an intermediate drive, drives a pinion that is engaged in the driving cable. The pinion is arranged in a front rain groove of a roof frame essentially on the center longitudinal axis of the roof of the motor vehicle. The intermediate drive is located in a gear housing to which the electric motor is flanged to form a drive unit. A secondary drive gear of the intermediate drive is detachably connected with a shaft of the pinion by mating internal and external gear elements. The drive unit comprising the electric motor and the intermediate drive can be exchanged for a hand crank having gear elements that correspond is shape to gear elements of the secondary drive gear without modification to the remainder of the roof arrangement.

13 Claims, 7 Drawing Figures

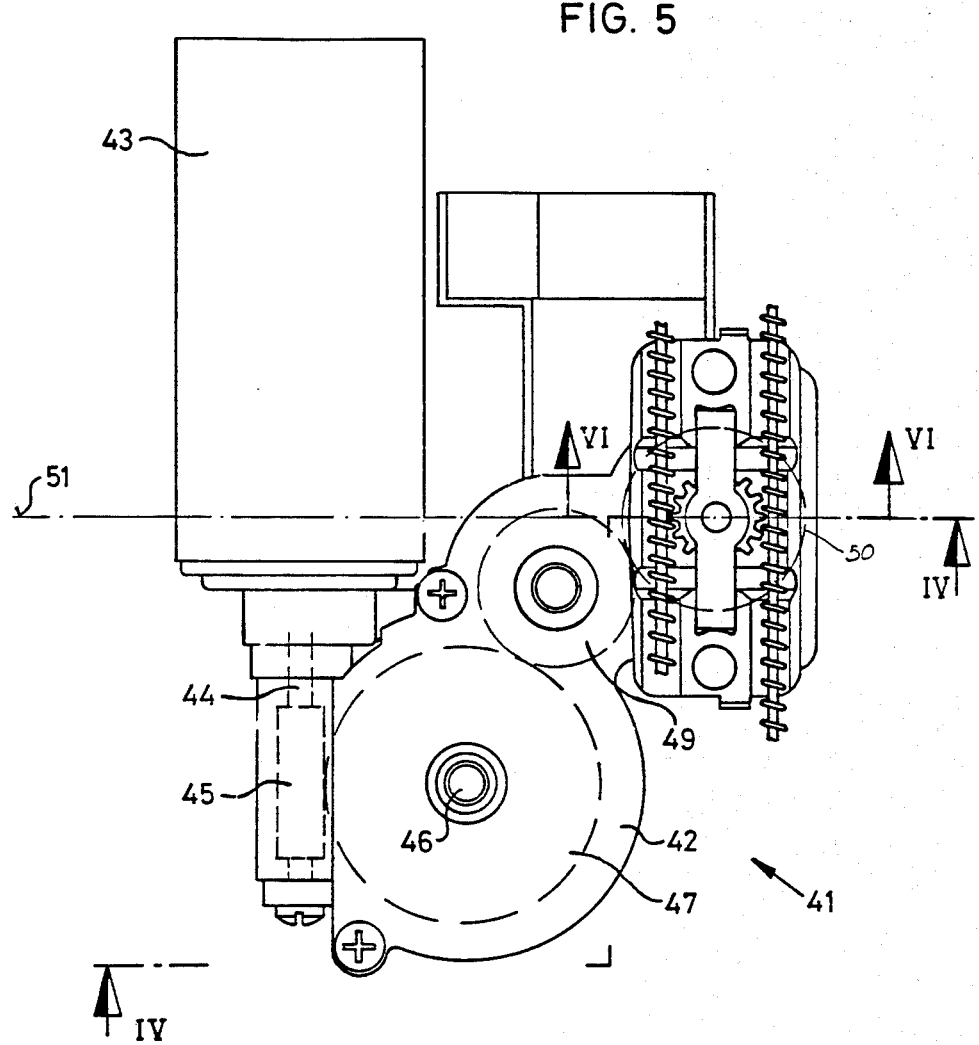

4,531,777

MOTOR VEHICLE ROOF ARRANGEMENT OF THE TYPE INTERCHANGEABLY DRIVEABLE BY BOTH MOTOR AND CRANK DRIVES

BACKGROUND AND SUMMARY OF THE INVENTION

The invention concerns a driving mechanism for motor vehicle roofs having a cover that can be slid and/or tilted out with respect to an opening in the roof, with the cover being movable by means of an electric motor, through at least one incompressible driving cable, with said electric motor being mounted in front of a front side of the opening of the roof on a stationary part of the roof, and by means of a secondary drive wheel of an intermediate drive that drives a pinion which engages in the driving cable and is arranged essentially on a central longitudinal axis of the motor vehicle, with said intermediate drive being disposed in a gear housing to which the electric motor is flanged forming a drive unit.

A driving mechanism of this type is known (DE-GM 78 01 538 and corresponding to U.S. Pat. No. 4,272,125). In this case, the electric motor is installed in front of the front side of the opening in the roof, so that it is located at a point where a crank drive of a manually operated driving mechanism must be located in order to be reached conveniently by the driver, as well as the front-seat passenger. In this manner, a relatively large number of identical parts may be used for motor drives and manual drives to be provided selectively. Additionally, this known mechanism has the driving pinion, its pinion shaft and the secondary drive wheel firmly connected with one another. Despite the installation of the electric motor at a point where, in the case of manually operated roofs, the crank handle is located, the selective use of motor drives and manual drives presents problems.

Thus, the present invention has for a primary object, the creating of a drive mechanism where the number of its parts, which are common to those used with a manual drive mechanism, are maximized.

According to a preferred embodiment of the present invention, this objective is achieved by means of the fact that the secondary drive wheel of the intermediate drive is detachably connected with the pinion shaft through a sliding pinion and stem gear, and that the drive unit comprising the electric motor and the intermediate drive may be exchanged for a hand crank, which is provided with the gear elements corresponding to the gear elements of the secondary drive wheel. The driving pinion, the pinion shaft and the pertaining bearing also become standardized parts, i.e., parts which a roof with a motor drive and a roof with a manual drive have in common.

This is especially significant when the driving pinion, as known from DE-OS No. 29 14 855 and its counterpart U.S. Pat. No. 4,332,416, is part of a preassembled installation unit which comprises at least the driving cable, cable-guide ducts, guiding tracks for guide shoes carrying the cover, as well as the guide shoes inserted into the guiding tracks. The reason for this significance is that the preassembled and preadjusted installation unit of the roof can then be produced in an identical manner, irrespective of whether it is to be utilized with a manual drive or a motor drive, so that a drive unit comprising an electric motor and an intermediate drive or a hand crank can be mounted without additional parts.

The drive unit is preferably generally V-shaped in plan view, and one leg of the drive unit is disposed transversely to the center longitudinal axis of the motor vehicle and contains the electric motor, while the other leg receives the intermediate drive and carries the pinion. This configuration is similar to the mechanism known from DE-GM 78 01 538 and U.S. Pat. No. 4,272,125, and makes the electric drive, extending transversely to the longitudinal axis of the motor vehicle, short enough to fit between depressions, which are generally provided for receiving sun visors, in a headlining layer covering the interior of the roof of the motor vehicle; despite the fact that the point of the motor shaft that engages with the intermediate gear is inevitably disposed laterally outside the central longitudinal axis of the motor vehicle, the driving pinion can be disposed on the central longitudinal axis of the motor vehicle.

The gear elements of a drive coupling may suitably be formed by notched teeth that can be engaged with one another. An especially strong construction is achieved if the drive coupling is formed by an outside serration of a gear element located at one end of the pinion shaft and an internal serration of the secondary drive wheel of the intermediate gear or of a secondary drive shaft carrying said secondary drive wheel, and the hand crank has an internal serration corresponding to the internal serration of the secondary drive wheel or the secondary drive shaft. For the pinion shaft gear element, a diameter is sufficient that is not, or not much larger than, the diameter of the pinion shaft. For that reason, in order to simplify the construction, the gear element and the pinion shaft can advantageously be unitarily formed with one another as a single piece.

In order to be able to still operate a roof having a motor drive when the motor drive is out of commission, the secondary drive wheel or the secondary drive shaft carrying said secondary drive wheel is, preferably, at a side facing away from the driving pinion, provided with an inside polyhedron, such as an inside hexagon, for matingly connecting with an emergency tool, such as an Allen-type wrench.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 5 shows a plan view of the arrangement according to FIG. 4;

DETAILED DESCRIPTION OF THE PREFERRED EMBODIMENT

Figure 1:
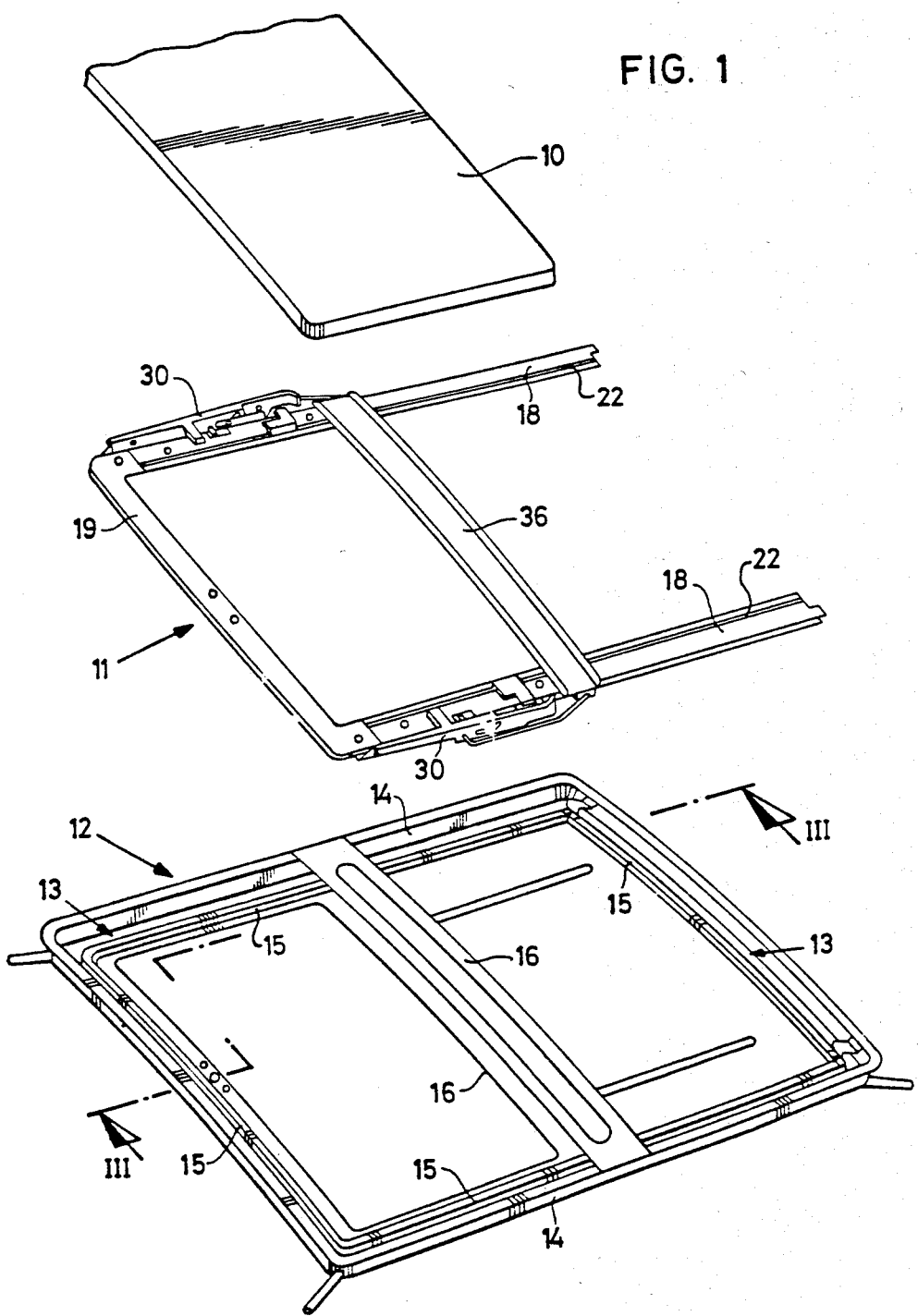
FIG. 1 shows a perspective exploded view of the individual components of a sliding-lifting roof according to the invention, consisting of a sliding-roof frame, an installation unit and a cover.
Figure 2:
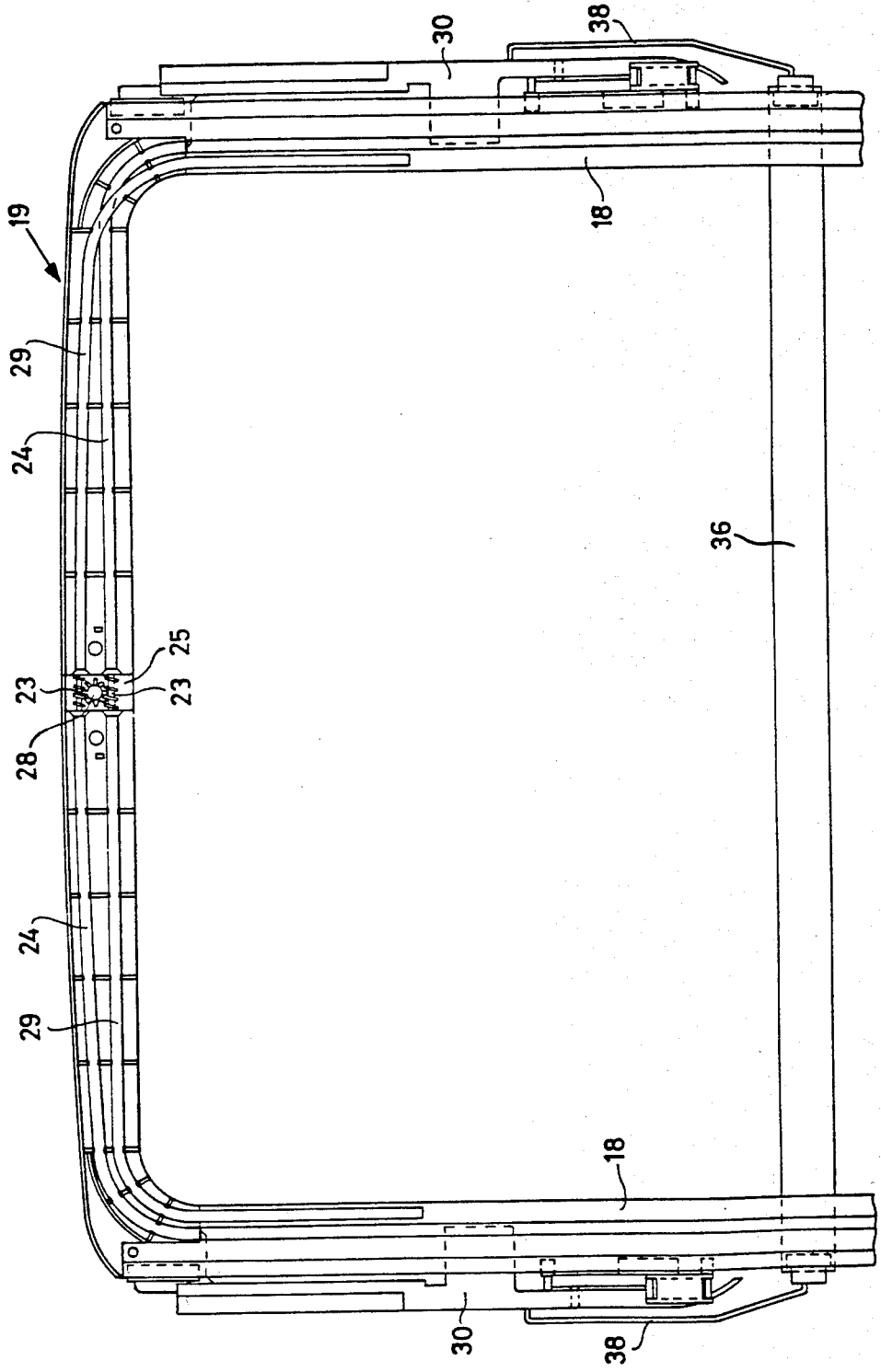
FIG. 2 shows a view of the installation unit according to FIG. 1 from below.

The sliding-lifting roof shown in FIG. 1 consists of a cover 10, an installation unit 11 with the guide elements that a motor drive and a manual drive have in common, and a roof frame 12. The roof frame 12 forms a surrounding rain groove 13 limited by an outer side 14 and an inner side 15. A traverse 16 connects the lateral edges of the roof frame 12 approximately in its center.

Figure 3:
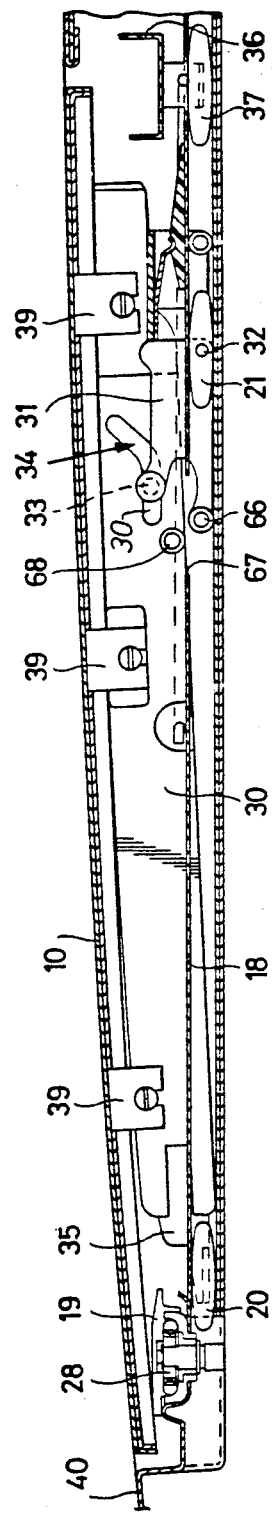
FIG. 3 shows a section along Line III—III of FIG. 1.

The installation unit 11, carrying the cover 10, has lateral guiding tracks 18, the front ends of which are connected with one another by a covering 19. When viewed in cross section, the guiding tracks 18 form U-shaped guides, in which the cover 10 is guided by means of front guide shoes 20 and rear guide shoes 21 that are inserted into tracks 18 (FIG. 3). In addition, each guiding track 18 has a guide duct 22 for an incompressible driving cable 23, said driving cable 23 engaging on the rear guide shoe 21 and being driven by a crank mechanism or an electric motor in the center of the front edge of an opening in the roof receiving the roof frame 12. Each of the two rear guide shoes 21 is connected with the drive means of its own driving cable 23. The driving cables 23, in the area of the front edge of the opening in the roof, are guided in tubes 24, which lead directly into the guide ducts 22. A cable guide piece 25, having a bearing bushing 26, is located in the center of the covering 19, with a pinion shaft 27 being disposed in said bearing bushing 26. The pinion shaft 27, at its upper end (FIGS. 4 and 7), has a pinion 28 engaging with the two driving cables 23. The free ends of the driving cables 23 are led into tubes 29, which, like the tubes 24, are clipped to the covering 19.

The guide shoes 20, 21, on both lateral sides of the cover 10, are connected with one another by a shield 30. The connection between the rear guide shoe 21 and the shield 30 takes place by means of a tilting-out lever 31 which, by means of an axle 32, is pivoted at the guide shoe 21 and, by means of a pin 33, engages in a slide slot 34 of the shield 30. The connection between the shield 30 and the front guide shoe 20 takes place by means of a guide shoe carrier 35. Another part of the installation unit 11 is a rear rain gutter 36 which is guided in the guiding tracks 18 by means of rods 38, each of which is connected with one of the shields 30 and a respective guide shoe 37 which is inserted into tracks 18 along with guide shoes 20, 21. Like the installation unit of the above-noted U.S. Pat. No. 4,332,416, the installation unit 11 can be tested for operational readiness in a completely preassembled condition and then mounted to the roof frame 12. After the insertion and fixing of the installation unit 11, the cover 10, by means of side tongues 39, is connected with the shields 30, such as by being screwed together.

Figure 4:
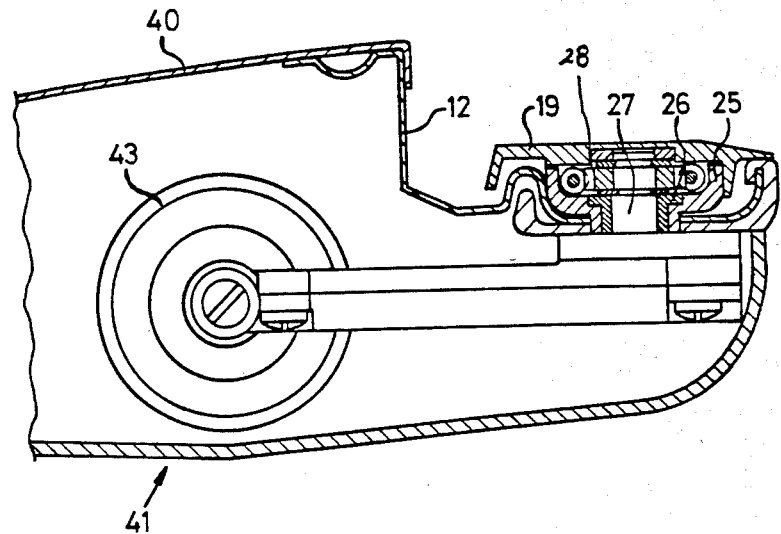
FIG. 4, in a larger scale, shows a section along Line IV—IV of FIG. 5, for a roof equipped with a motor drive.

In the case of the embodiments according to FIGS. 4 to 6, a drive unit 41 is mounted below the roof frame 12 or the fixed roof wall 40 connected with it. The drive unit 41 has a gear housing 42 to which an electric motor 43 is flanged. The motor shaft 44, which projects into the gear housing 42, carries a worm gear 45 which engages with a gear wheel 47 located on a shaft 46. The gear wheel 47 mates with an intermediate wheel 49, which itself engages with a driving wheel 50. The wheels 47–50 form an intermediate drive located in the gear housing 42. As shown in FIG. 5, the drive unit 41, in plan view, has the general shape of a V, one of the legs of which is formed by the electric motor 43 and is arranged transversely to the center longitudinal axis 51 of the motor vehicle, while the other leg is formed by the intermediate drive.

Figure 6:
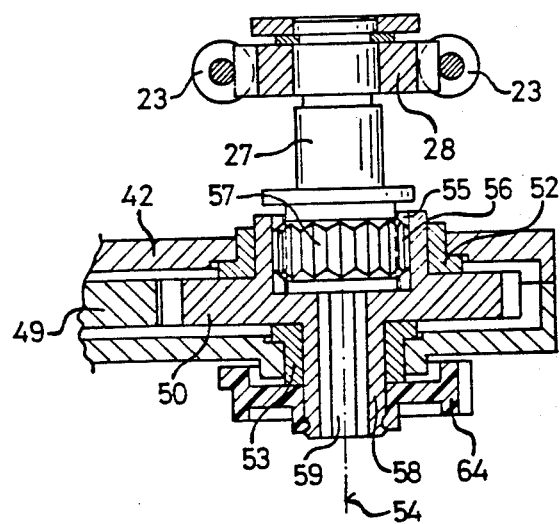
FIG. 6, in a still larger scale, shows a section along Line VI—VI of FIG. 5, with a covering and cable guide piece omitted for illustration purposes.

As shown most clearly in FIG. 6, the secondary drive wheel 50 is disposed in the gear housing 42 and supported, on opposite sides, by means of bearing bushings 52, 53, receiving the annular projection that is shown in FIG. 6 and secondary drive shaft 58, respectively. The secondary drive wheel 50 is provided with an internal serration 55 that is concentric to its axis of rotation 54. The internal serration 55 engages with a corresponding external serration 56 of a gear wheel 57 located at the lower end of the pinion shaft 27. The gear wheel 57 and the pinion shaft 27 are unitarily connected with one another as a single piece. At the lower end of the secondary drive wheel 50, or the secondary drive shaft 58 thereof, an internal hexagon 59 is located, by means of which the secondary drive wheel 50 and the pinion 28 can be engaged with an emergency tool, such as an Allen-type wrench, if the motor drive should be out of commission. During the emergency operation, the gear wheel 49, in a manner that is not shown in detail, is disengaged from the gear wheel 47 and/or 50. This permits an adjustment of the cover 10 even in cases where the worm gear 45 and the gear wheel 47 are self-locking.

Figure 7:
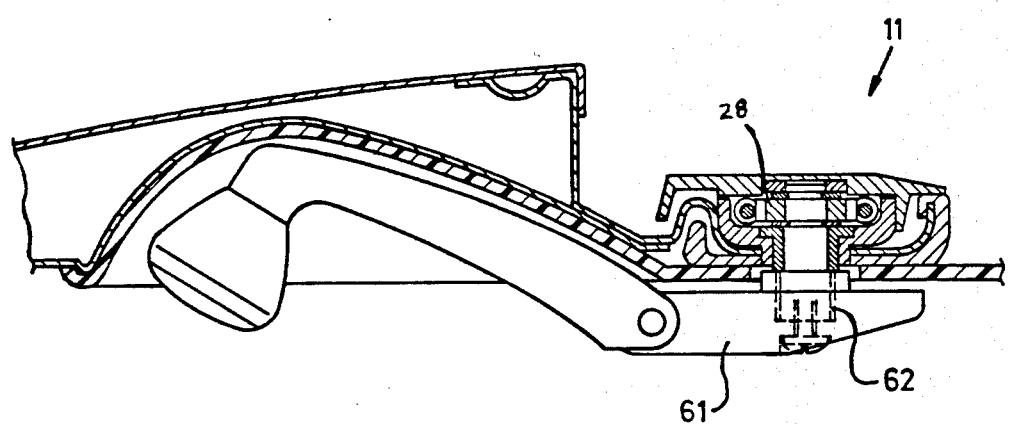
FIG. 7 shows a section corresponding to FIG. 4, for a roof equipped with a manual drive.

If, instead of a motor drive, a manual drive is to be provided, a hand crank 61 (FIG. 7) is simply slipped on the lower end of the pinion shaft 27, and may be held thereon by a screw, such as by the unnumbered screw illustrated passing through crank 61 in FIG. 7. The hand crank 61 is provided with an internal serration 62, corresponding in configuration to the internal serration 55 of the secondary drive wheel 50, for drivingly engaging the external serration 56 of gear wheel 57. No change to the installation unit 11, including the pinion 28, is required for the purpose of accepting the manual drive instead of the motor drive, so that it may be constructed in an identical manner, irrespective of whether a motor drive or a manual operation is to be ultimately utilized.

In FIG. 6, a switching wheel 64 is shown mounted on the lower end of the secondary drive shaft 58 that projects from the gear housing 42. The switching wheel 64 is used for the actuation of an electrical switching device, which terminates the flow of current to the electric motor 43, in the closed position of the cover 10 and/or the fully pushed-back position of the cover, as well as the tilted-out position of the cover. This switching device is not part of the present invention and, therefore, requires no further explanation.

When the rear edge of the cover 10 is to be tilted out, a sliding of the rear guide shoes 21 and of the tilting-out levers 31 connected with said guide shoes 21 takes place through the electric motor 43 (FIGS. 4–6) or the hand crank 61 (FIG. 7), by a corresponding movement of the driving cables 23 to the left in FIG. 3, until the pins 33 rest against the end of the link slits 34 that is on the left in FIG. 3. When the rear guide shoe 21 is moved further to the front (to the left in FIG. 3), the lever 31 stands up and lifts the rear edge of the cover 10, while the front end of the cover 10 is held by the front guide shoe 20. For closing of the cover, starting from the tilted-out position, the guide shoes 21, by means of the driving cables 23, are slid to the right, in FIG. 3, in which case the tilting-out levers 31 first swivel downward until a roller 66, mounted at each tilting-out lever, passes through a cutout 67 into the U-shaped guides of the guiding tracks 18 (FIG. 3). When the cover 10 is then to be slid toward the rear under the stationary part of the roof, the driving cables 23 adjust the guide shoes 21 (FIG. 3) further toward the right, in which case the pin 33 reaches the section of the link slit 34 that is on the right in FIG. 3. Since the roller 66 is now located under the upper limit of the guiding track 18, the tilting out lever 31 can no longer rise. Rather, the shield 30 and, with it, the cover 10 are pulled downward, so that a roller 68, mounted to the shield 30, passes through the cutout 67 and enters the guiding track 18. Consequently, the cover 10 is lowered so far that it can be pulled behind the stationary part 69 of the roof, when the guide shoe 21 is moved further to the right.

Naturally, the manner in which the drive (motor driven or manual) connects with the pinion, shown in the illustrated embodiments, may also be constructed in a modified manner. The pinion shaft 27, for example, may be equipped with an internal serration at its lower end, while the hand crank and either of the secondary drive wheel 50 or the upper end of the shaft 58 thereof, respectively, can have an external serration.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. In a motor vehicle roof arrangement of the type having a cover that is displaceable into and out of a position closing an opening in the roof through interchangeable use of one of both an electric motor and a crank drive, in conjunction with at least one incompressible driving cable and a pinion that engages in the driving cable and is arranged essentially on a center longitudinal axis of the motor vehicle roof in the vicinity of a front edge of the roof opening, the electric motor being flanged to a gear housing containing an intermediate drive so as to form a motor drive unit, the improvement for maximizing the number of parts used with both the electric motor and the crank drive, wherein the pinion is provided with a pinion shaft having gear elements at a portion thereof displaced from said pinion for interchangeably detachably engaging gear elements of a secondary drive wheel of the intermediate drive of the motor drive unit and correspondingly configured gear elements of the crank drive, said gear elements of the pinion shaft are formed by external serrations of a gear wheel at one end of the pinion shaft, the gear elements of the secondary drive wheel are internal serrations, and the hand crank has internal serrations corresponding to the internal serrations of the secondary drive wheel, wherein the internal serrations of the secondary drive wheel are formed within an annular projection that is supported within said gear housing at a side that faces toward the pinion, by way of a bearing bushing, and said secondary drive wheel is supported within said gear housing, at an opposite side that faces away from the pinion, by way of a second bearing bushing which receives a secondary drive shaft that projects from said opposite side.

2. An arrangement according to claim 1, wherein the pinion is part of a preassembled installation unit, which comprises the driving cable and at least guide ducts, guiding tracks and guide shoes for carrying the cover, the guide shoes being inserted into the guiding tracks.

3. An arrangement according to claim 2, wherein the drive unit, in plan view, has a V-shape, a leg of which is defined by the electric motor and is arranged transversely to the longitudinal axis of the motor vehicle, and the other leg of which receives the intermediate drive.

4. An arrangement according to claim 1, wherein the drive unit, in plan view, has a V-shape, a leg of which is defined by the electric motor and is arranged transversely to the longitudinal axis of the motor vehicle, and the other leg of which receives the intermediate drive.

5. An arrangement according to claim 1, wherein the gear wheel is unitarily connected with the pinion shaft as a single piece.

6. An arrangement according to claim 5, wherein the secondary drive wheel, on a side that faces away from the pinion, is equipped with an internal polyhedron for forming a mating connection with an emergency tool.

7. An arrangement according to claim 6, wherein said internal polyhedron is formed in an end of a shaft of the secondary drive wheel projecting away from said pinion.

8. An arrangement according to claim 2, wherein the gear wheel is unitarily connected with the pinion shaft as a single piece.

9. An arrangement according to claim 4, wherein the gear wheel is unitarily connected with the pinion shaft as a single piece.

10. An arrangement according to claim 1, wherein the secondary drive wheel, on a side facing away from the pinion, is equipped with an internal polyhedron for forming a mating connection with an emergency tool.

11. An arrangement according to claim 2, wherein the secondary drive wheel, on a side facing away from the pinion, is equipped with an internal polyhedron for forming a mating connection with an emergency tool.

12. An arrangement according to claim 1, wherein said cover is mounted for sliding displacement and tilting displacement from said position closing the roof opening.

13. An arrangement according to claim 2, wherein said cover is mounted for sliding displacement and tilting displacement from said position closing the roof opening.

* * * * *